US009510160B2

(12) United States Patent
Agulnik et al.

(10) Patent No.: US 9,510,160 B2
(45) Date of Patent: Nov. 29, 2016

(54) ENHANCED NETWORK-NETWORK INTERFACE SYSTEMS AND METHODS FOR MULTIMEDIA BROADCAST MULTICAST SERVICES

(71) Applicant: MOTOROLA SOLUTIONS, INC., Schaumburg, IL (US)

(72) Inventors: Anatoly Agulnik, Deerfield, IL (US); Peter M. Drozt, Prairie Grove, IL (US); Michael F. Korus, Eden Prairie, MN (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 784 days.

(21) Appl. No.: 13/664,527

(22) Filed: Oct. 31, 2012

(65) Prior Publication Data
US 2014/0120973 A1    May 1, 2014

(51) Int. Cl.
*H04W 4/06* (2009.01)
*H04W 4/10* (2009.01)

(52) U.S. Cl.
CPC .............. *H04W 4/06* (2013.01); *H04W 4/10* (2013.01)

(58) Field of Classification Search
CPC ......... H04L 65/1016; H04L 41/0803; H04W 48/18; H04W 4/10; H04W 4/06; H04W 4/08; H04W 16/32; H04W 48/08; H04W 88/02; H04W 84/042; H04W 84/045; H04W 8/02; H04W 8/04; H04W 8/06; H04W 8/08
USPC ....................................................... 455/509
See application file for complete search history.

(56) References Cited

U.S. PATENT DOCUMENTS 6,275,471 B1    8/2001    Bushmitch et al.
6,567,929 B1    5/2003    Bhagavath et al.
(Continued)

FOREIGN PATENT DOCUMENTS

EP    1 838 034 A1    9/2007
EP    2211587 A1    7/2010
(Continued)

OTHER PUBLICATIONS

Kenneth C. Budka et al. "Public Safety Mission Critical Voice Services Over LTE", Bell Labs Technical Journal, Special Issue: Vertical Markets, vol. 16, Issue 3.
(Continued)

*Primary Examiner* — Andrew Wendell
*Assistant Examiner* — Maryam Soltanzadeh

(57) ABSTRACT

A method between a controlling server and a participating server, a network, and a server include enhanced signaling via a Multicast-Broadcast Single Frequency Network (MBSFN) report allowing User Equipment (UE) to communicate MBSFN areas to a controlling server. Thus, the enhanced controlling server's Multimedia Broadcast Multicast Services (MBMS) decisions can count all visiting devices in addition to its own in its MBSFN areas. The method, network, and server include new signaling and additional info to provide a participating server with MBSFN areas that will have MBMS activated for a group session. This enhances the participating server's determination of which its visiting devices need unicast bearers. The participating server can add information related to the current MBSFN area of its UE to a message to the controlling server indicating joining the UE to a group.

19 Claims, 6 Drawing Sheets

(56) References Cited

U.S. PATENT DOCUMENTS

| | | | |
|---|---|---|---|
| 7,054,302 B2 | 5/2006 | Albal et al. | |
| 7,127,496 B2 | 10/2006 | Isozu et al. | |
| 7,457,862 B2 | 11/2008 | Hepworht et al. | |
| 7,493,117 B2 | 2/2009 | Cai et al. | |
| 7,650,159 B2* | 1/2010 | Poikselka | H04W 4/10 455/517 |
| 7,744,012 B2 | 6/2010 | Manders | |
| 7,764,668 B2 | 7/2010 | Yoshizawa | |
| 7,764,971 B2 | 7/2010 | Chu | |
| 7,885,199 B2 | 2/2011 | Mooney et al. | |
| 8,166,520 B2 | 4/2012 | Holm et al. | |
| 2004/0133683 A1 | 7/2004 | Keller et al. | |
| 2005/0243721 A1* | 11/2005 | Cai | H04L 12/18 370/230 |
| 2007/0097886 A1 | 5/2007 | Schwagmann et al. | |
| 2007/0100941 A1 | 5/2007 | Lee et al. | |
| 2008/0076403 A1 | 3/2008 | Park et al. | |
| 2008/0181145 A1 | 7/2008 | Chowdhury et al. | |
| 2009/0005100 A1 | 1/2009 | Copeland | |
| 2009/0086689 A1* | 4/2009 | Hunt | H04W 28/06 370/338 |
| 2011/0019604 A1 | 1/2011 | Chun et al. | |
| 2012/0170502 A1 | 7/2012 | Korus et al. | |
| 2012/0309405 A1* | 12/2012 | Parkvall | H04W 48/08 455/452.1 |
| 2013/0196706 A1* | 8/2013 | Patel | H04W 4/10 455/518 |
| 2015/0036494 A1* | 2/2015 | Kotecha | H04W 4/06 370/235 |
| 2015/0257151 A1* | 9/2015 | Lin | H04W 4/08 370/259 |
| 2015/0327043 A1* | 11/2015 | Das | H04W 52/0206 455/418 |

FOREIGN PATENT DOCUMENTS

| | | |
|---|---|---|
| WO | 2008119396 A1 | 10/2008 |
| WO | 2009052859 A1 | 4/2009 |
| WO | 2009121406 A1 | 10/2009 |

OTHER PUBLICATIONS

"Push to talk over cellular (PoC) Architecture: OMA-AD-POC-V2-1-20110802-A," Open Mobile Alliance (OMA), San Diego, CA, USA, No. 2.1, Aug. 2, 2011, Retrieved from the interner URL: http://member.openmobilealliance.org/ftp/public_documents/COM/COM-POC/Permanent_documents/, on Jun. 17, 2014, pp. 1-129.

"Project 25 : P25 and/or APCO-25," Association of Public Safety Communications Officials-International (APCO), Oct. 1989, Retrieved from the internet url: http://www.mctx.org/departments_d-k/departments_q-z/radio_shop/docs/p25.htm, on Jun. 17, 2014, pp. 1-4.

"Project 25 Inter-RF Subsytem Interface Protocol(s) (ISSI) defined in TIA-102.BACA-A", Jan. 2009, Retrieved from the internet url: http://www.nist.gov/itl/antd/emntg/ps_p25_issi.cfm, on Jun. 17, 2014, pp. 1-2.

"Universal Mobile Telecommunications System (UMTS); LTE; Multimedia Broadcast/Multicast Service (MBMS); Architecture and functional description (3GPP TS 23146 version 10.3.0 Release 10)," Technical Specification, European Telecommunications Standards Institute (ETSI), France, vol. 3GPP SA 2, No. V10.3.0, Mar. 1, 2012, section 11, pp. 1-67.

Non-Final Office Action mailed Feb. 24, 2014, in U.S. Appl. No. 13/190,768, Eitan Koren et al., filed Jul. 26, 2011.

International Search Report and Written Opinion for counterpart International Patent Application No. PCT/US2012/046566 mailed Apr. 16, 2013.

International Search Report and Written Opinion for counterpart International Patent Application No. PCT/US13/66510 mailed Feb. 27, 2014.

International Search Report and Written Opinion for counterpart International Patent Application No. PCT/US2013/064050 mailed Dec. 6, 2013.

Schulzrinne et al.,"RTP: A Transport Protocol for Real-Time Applications", Network Working Group rfc3550.txt, Jul. 1, 2003, 89 pages.

* cited by examiner

ENHANCED NETWORK-NETWORK INTERFACE SYSTEMS AND METHODS FOR MULTIMEDIA BROADCAST MULTICAST SERVICES

CROSS REFERENCE TO RELATED APPLICATION

The present application is related to U.S. patent application Ser. No. 13/652,762, entitled "Enhanced Push to Talk Systems and Methods with Floor Control and Media Traffic Optimization," which application is commonly owned and filed on Oct. 16, 2012.

FIELD OF THE DISCLOSURE

The present disclosure relates generally to wireless networking and more particularly to systems and methods for enhanced Network-Network Interface (NNI) systems and methods for Multimedia Broadcast Multicast Services (MBMS).

BACKGROUND

Multimedia Broadcast Multicast Services (MBMS) is a point-to-multipoint interface specification for existing and upcoming wireless networks. For broadcast transmission across multiple cells, MBMS defines transmission via single-frequency network configurations. Multicast-Broadcast Single Frequency Network (MBSFN) is a communication channel defined in Long Term Evolution (LTE), the fourth-generation (4G) cellular networking standard. MBSFN includes a plurality of cells combined to a single frequency with the cells all transmitting the same data. Logically MBSFN makes different cell antennas appear as a single cell antenna with a large coverage area. From a radio's perspective, it is combining signals from what appears as a single cell, but with some delay spread. One exemplary application for MBMS and/or MBSFN is public safety applications such as using Push-to-Talk (PTT) for public safety responders.

In various PTT applications, there can be various user equipment (UEs) that participate in PTT calls outside their associated home server. For example, multiple user equipment (UE) can be on a scene of an incident or the like with some UEs being from different PTT server areas. As such, various conventional network-network interface (NNI) techniques have been developed between servers for handling PTT services. An exemplary NNI is the Open Mobile Alliance (OMA) Push to talk Over Cellular V2.1 (August, 2011), the contents of which are incorporated by reference herein. Another exemplary NNI is the Project 25 Inter-RF Subsystem Interface Protocol(s) (ISSI) defined in TIA-102.BACA-A (January 2009), the contents of which are incorporated by reference herein.

Disadvantageously, in current systems and methods, a controlling server is aware of all its group members, however, it can only manage resources for members homed at the controlling server. The controlling server does not know about visiting UEs that belong to participating server(s), therefore it cannot consider them when making decision on utilizing or not MBMS service in each of the MBSFN areas. On the other hand, a participating server does not know whether it's UEs which are visiting the controlling server's area will be able to receive voice via MBMS in the area or whether they need voice to be delivered to them via uncast bearer. It would be advantageous for a controlling server to have information regarding how many UEs are in an area for possibly allocating MBMS resources in a given MBSFN area for a call.

Accordingly, there is a need for systems and methods for enhanced Push to Talk (PTT) Network-Network Interface (NNI) systems and methods for Multimedia Broadcast Multicast Services (MBMS).

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
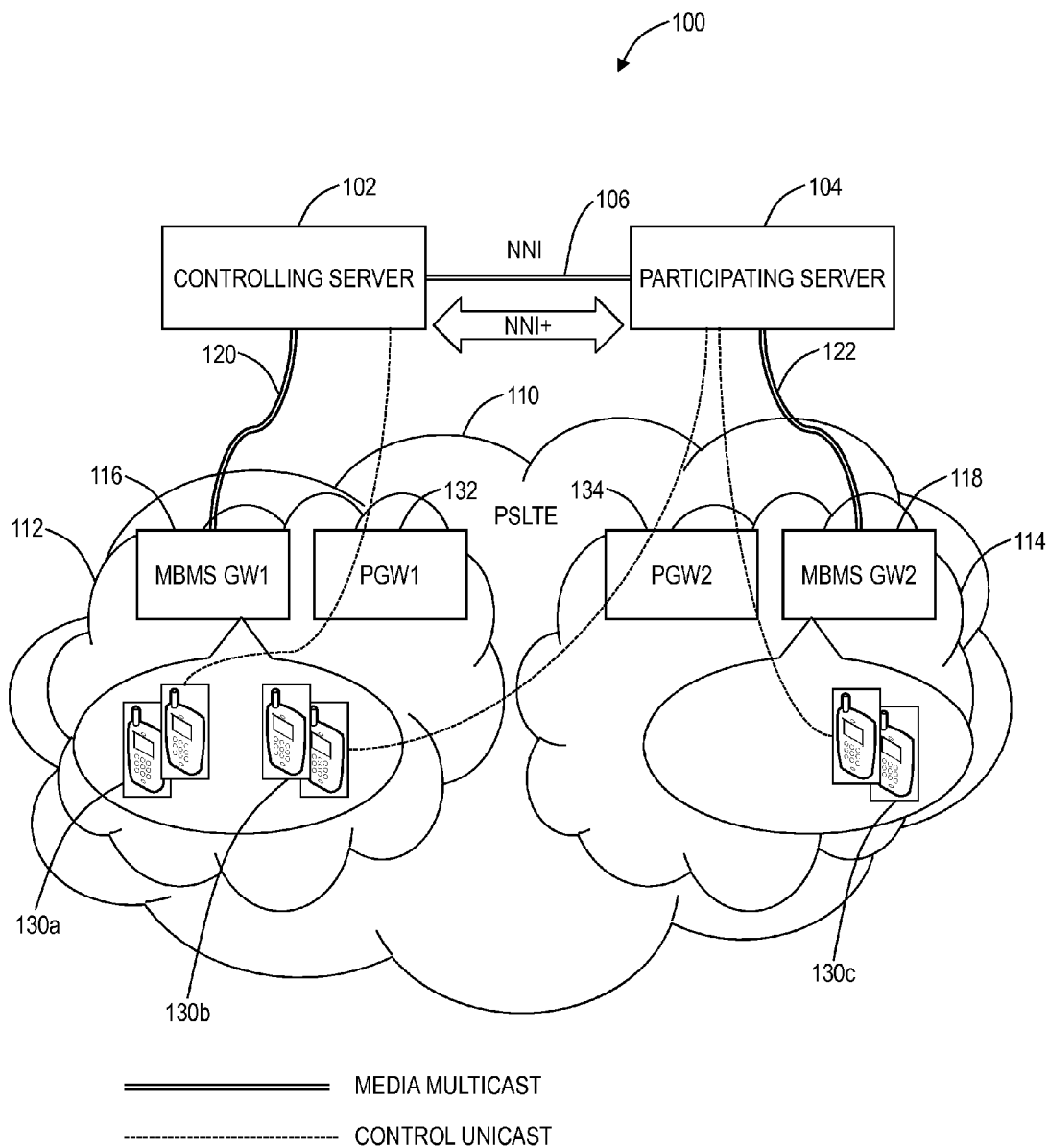
FIG. 1 is a network diagram of a network for the NNI systems and methods in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, a method between a controlling server and a participating server, a network, and a server are described. The method, network, and server include enhanced signaling via an MBSFN report allowing UEs to communicate MBSFN areas to a controlling server. Thus, the enhanced controlling server's MBMS decisions can count all visiting devices in addition to its own in its MBSFN areas. The method, network, and server include new signaling (e.g., a Media Burst Control Protocol (MBCP) update) and additional information in an MBCP Request to provide a participating server with MBSFN areas that will have MBMS activated for a group session. This enhances the participating server's determination of which of its visiting devices need unicast bearers. The participating server can add information related to the current MBSFN area of its UE to a message to the controlling server indicating joining the UE to a group (e.g., to SIP INVITE for a chat-group call model).

In an exemplary embodiment, a method between a controlling server and a participating server includes establishing a session between the participating server and the controlling server responsive to a first User Equipment (UE) belonging to the participating server joining a group session homed at the controlling server; providing, by the participating server to the controlling server, a current broadcast area of UEs in the group session that belong to the participating server and that are currently outside their home broadcast areas; and allocating broadcast bearers by the controlling server to be used by all UEs within broadcast areas of the controlling server based on the providing step and local policy.

In another exemplary embodiment, a network includes a controlling server, a participating server communicatively coupled to the controlling server via a network-network interface (NNI) link, and at least one user equipment (UE) homed at and communicatively coupled to the participating server; wherein the at least one UE provides an update to the participating server related to Multicast-Broadcast Single Frequency Network (MBSFN) areas currently visited which are outside of MBSFN areas of the participating server; wherein the participating server provides an update to the controlling server related to the MBSFN areas currently visited by the at least one UE; and wherein the controlling server allocates Multimedia Broadcast Multicast Services (MBMS) bearers for MBSFN areas of the controlling server based on a total number of UEs in the MBSFN areas of the controlling server including both UEs homed at the controlling server and UEs visiting the MBSFN areas of the controlling server.

In yet another exemplary embodiment, a server includes a network interface communicatively coupled to a network, wherein the server is communicatively coupled to a second server and at least one User Equipment (UE) homed at the server; a processor; and memory storing instructions that, when executed, cause the processor to: receive Multicast-Broadcast Single Frequency Network (MBSFN) area updates from the at least one UE; configure the server to operate as one of a controlling server and a participating server for a group call; provide the second server the MBSFN area updates when configured as the participating server; and allocate Multimedia Broadcast Multicast Services (MBMS) bearers when configured as the controlling server based on a total number of UEs including visiting UEs.

Referring to FIG. 1, in an exemplary embodiment, a network diagram illustrates a network 100 for the NNI systems and methods. The network 100 includes a controlling server 102 and at least one participating server 104 communicatively coupled to one another via an NNI link 106. The network 100 further includes a public safety (PS) LTE network 110 with MBSFN areas 112, 114 being served by MBMS gateways (GW) 116, 118, respectively. The MBMS gateway 116 has a media multicast connection 120 to the controlling server 102, and the MBMS gateway 118 has a media multicast connection 122 to the participating server 104. The network 100 includes various UEs 130 (that is, UEs 130a, 130b, and 130c) all participating in a PTT group call. For example, UEs 130a are homed by the controlling server 102 in the MBSFN area 112, UEs 130b are visiting the MBSFN area 112 but are homed by the participating server 104, and UEs 130c are homed by the participating server 104 and in the MBSFN area 114 but participating in the group call with the UEs 130a, 130b. The UEs 130a communicate with the controlling server 102 via a Packet Data Network (PDN) gateway (PGW) 132, and the UEs 130b, 130c communicate with the participating service via a PGW 134. Those of ordinary skill in the art will recognize the network 100 is depicted for illustration purposes of the NNI systems and methods. Other configurations and components are also contemplated.

The NNI systems and methods provide the NNI link 106 between the servers 102, 104 to support PTT over the PS LTE network 110. It is assumed that the LTE network 110 always routes traffic from the UEs 130a, 130b, 130c to their respective home networks. For a group PTT service, there is always only one PTT server that controls a particular group session, i.e. the controlling server 102. The group PTT service can involve the UEs 130a that belong to the controlling server 102 and some UEs 130b, 130c that belong to other PTT servers, i.e., the participating server 104. Of course, the roles of the servers 102, 104 can change for different group PTT sessions. Thus, UEs 130 involved in the same group session may be located at their home PS LTE region or may be visiting another PS LTE region. In any case, all UEs 130 are communicating with and being controlled by their home PTT server 102, 104.

For a group session, the controlling server 102 controls the group session status and communicates directly with its own UEs 130a and with other UEs 130b, 130c via their home PTT servers, i.e., the participating server 104. Using unicast only, the controlling server 102 distributes voice the same way: directly to its own UEs 130a and via the participating servers 104 to the other UEs 130b, 130c even if they are also located in the controlling server 102 home area. The main assumption for MBMS case is that the servers 102, 104 have separate parts of LTE network 110 under their control (e.g., the separate MBSFN areas 112, 114, different pools of PGWs 132, 134, Serving gateways (SGWs), Mobile Management Entities (MMEs), etc.) and can allocate and use MBMS resources only at their home PS LTE regions. Thus, with MBMS, each of the servers 102, 104 can distribute voice to its own devices at home using MBMS service or choose to send unicast (depending on local policy).

Conventionally, the controlling server 102 is aware of all group members, however it can only manage resources for members homed at the controlling server (i.e., the UEs 130a). The controlling server 102 does not know about visiting devices, i.e., the UEs 130b, that belong to participating server(s) 104, therefore the controlling server cannot consider them when making a decision on utilizing an MBMS service in each of the MBSFN areas 112, 114. On the other hand, the participating server 104 does not know whether its UEs 130b that are visiting the controlling server's 102 area will be able to receive voice via the MBMS GW 116 or whether they need voice to be delivered to them via a uncast bearer.

Thus, conventionally, the controlling server 102 does not know about visiting devices, i.e., the UEs 130b, and the participating server 104 does not know whether its devices, i.e., the UEs 130b, 130c, will be provided with MBMS service or need unicast channels. For example, the controlling server 102 may not choose to use the MBMS GW 116 in the MBSFN area 112 since there are not enough UEs 130a to justify MBMS over unicast, but using unicast for all UEs 130a, 130b is wasting bandwidth and it may not be possible to acquire all the needed unicast bearers for the UEs 130a, 130b. The controlling server 102 can assign a broadcast bearer for the UEs 130a, 130b in the MBSFN area 112 but the participating server 104 can also establish unicast bearers for the UEs 130b, wasting bandwidth or even failing (or delaying) the call if some needed unicast bearers are unavailable.

Thus, the NNI systems and methods address these aforementioned challenges with the controlling server 102 and the participating server 104. That is, the NNI systems and methods enable making the controlling server 102 aware of the visiting UEs 130b to allow a making of better decisions on utilizing MBMS services. Further, the NNI systems and methods make the participating server 104 aware of its UEs 130b out of home that will receive voice via MBMS service in visiting areas and the UEs that need voice to be sent over unicast bearers.

In various exemplary embodiments, the NNI systems and methods include enhancements to the NNI link 106. Specifically, the participating server 104 shall provide the controlling server 102 with current MBSFN areas 112, 114 of devices in a group session that are homed at the participating server 104 and are currently outside of their home MBSFN areas 112, 114 (i.e., mobility has taken them to "visiting" MBSFN areas). If the participating server 104 has MBSFN areas 112, 114-to-controller mapping, the participating server can limit MBSFN area 112, 114 reporting to only those UEs 130b in the controlling server's 102 MBSFN area 112. The controlling server 102 provides the participating server 104 with information related to activated session MBSFN areas 112, thereby allowing the participating server 104 to determine which of its UEs 130b will be able to use the MBMS GW 116 in the controlling server's 102 MBSFN area 112. The participating server 104 can then make local decisions on which UEs 130b, 130c will require unicast delivery. The controlling server 102 is responsible for allocating MBMS bearers for use by all UEs 130a, 130b within its MBSFN Area 112.

The foregoing table describes functionality on the NNI link 106 for supporting the NNI systems and methods.

TABLE 1

NNI Supported Functionality- MBMS over NNI

| Functionality | Description |
| --- | --- |
| MBMS usage | The controlling server 102 considers all devices (local and visiting) for allocation MBMS bearers in the MBSFN areas under its control to enable MBMS usage for visiting devices in the controlling areas (along with the devices at home). |
| MBFSN area to controlling server | The participating server 104 provides the controlling server 102 with the MBSFN area for each participating UE that is located in the MBSFN area 112 under the controlling server 102 OR with total number of its UE in each MBSFN area 112, 114 (e.g. the UEs 130b in the MBSFN area 112 and the UEs 130c in the MBSFN area 114 OR the UEs 130b in the MBSFN area 112). |
| Activated MBSFN areas | The controlling server 102 informs the participating server 104 which participating UEs 130b will use MBMS bearers allocated by the controlling server 102. |
| Changes in activated MBSFN areas | The controlling server 102 informs the participating server 104 about allocating/releasing MBMS bearers in the MBSFN area 112 with the participating UEs 130b. |
| Unicast | The participating server 104 allocates unicast bearers for its UEs that do not use MBMS bearers in the MBSFN areas 112 under the controlling server 102. |

The foregoing table describes NNI enhancements on the NNI link 106 for supporting the NNI systems and methods.

TABLE 2

NNI Enhancements - MBMS over NNI

| Procedure | Enhancement Description | additional messages or information |
| --- | --- | --- |
| SIP session setup | the participating server 104 attaches the current MBSFN area to SIP INVITE message from its UEs (if this MBSFN area belongs to the controlling server) Note: it can be any other message indicating joining to a group | INVITE from the participating server 104 will include the UE's MBSFN area |
| MBCP (or Talk Burst Control Protocol (TBCP) Start Request | provide the participating server 104 with a list of MBSFN areas with allocated MBMS bearer the list may be limited to the areas with the participating server's 104 UEs | the list of activated MBSFN areas |
| MBCP Update | provide the participating server 104 with updates to the list of activated MBSFN areas new MBSFN areas activated and to provide changes in the call status and resources allocation to the controlling server may include a list of UEs with or without MBMS coverage | MBCP Update new MBSFN areas activated de-allocation of MBMS bearer in previously activated areas |
| MBSFN Report | the participating server 104 receives an UE MBSFN Update from one of its participating devices and provides the controlling server with MBSFN area change for this device If a new area in UE MBSFN Update is equal to 0 then the participating server 104 informs the controlling server 102 that the UE is out of the controlling server's MBSFN area (e.g. old = N, new = NONE) The same if the UE moved out from the controlling server's 102 MBSFN areas back home or changed visited region. | MBSFN Report on Real Time Control Protocol (RTCP) new and old MBSFN areas new area = 0 if the device cannot use MBMS in the controlling server's areas any longer |

Figure 2:
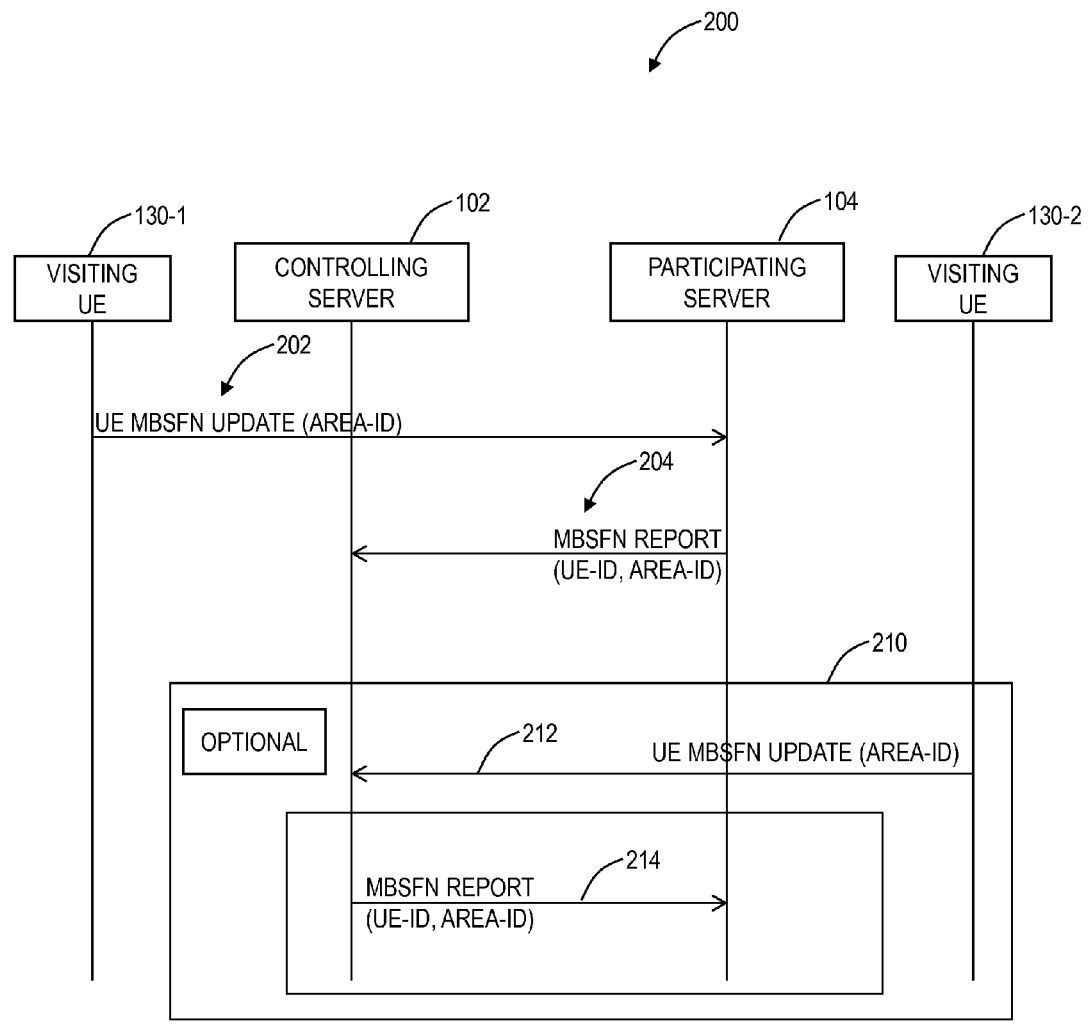
FIG. 2 is a flow diagram of an MBSFN Report procedure showing signaling between a controlling server, a participating server, and two UEs in accordance with some embodiments.

Referring to FIG. 2, in an exemplary embodiment, a flow diagram depicts an MBSFN Report procedure 200 showing signaling between the controlling server 102, the participating 104, and two UEs 130-1, 130-2. Notice that the MBSFN Report procedure 200 is defined for a particular group session. Therefore if the UE 130-1, 130-2 has joined several groups then a single UE MBSFN Update message can trigger several procedures between the UE's server 102, 104 and other servers involved in those group sessions. In this exemplary embodiment, the UE 130-1 is homed at the participating server 104, but is visiting in an area associated with the controlling server 102. The UE 130-2 is homed at the controlling server 102, but is visiting another area. The MBSFN Report procedure 200 includes MBSFN Report and Update messages which can be sent as MBCP messages on an Real Time Control Protocol (RTCP) session that was created between the servers 102, 104 when the first UE 130-1, belonging to the participating server 104, joined the group session.

In the example of FIG. 2, the controlling server 102 owns the group. The participating server 104 owns the UE 130-1 that has joined the group and now moves into a MBSFN area that is owned (managed) by the controlling server 102. The UE 130-1 realizes that it has changed MBSFN area and sends a UE MBSFN Update message 202 to its server, i.e., the participating server 104, with the new MBSFN area ID. The participating server 104 determines that the UE 130-1 is located in a MBSFN area under the controlling server 102 and informs the controlling server 102 of the new area id of the UE 130-1 via a MBSFN Report message 204, which message includes identification of the UE 130-1 and an indication that the UE 130-1 is in the MBSFN area under the controlling server 102. Optionally, the participating server 104 could provide the old and new area IDs. As a result of the MBSFN Report procedure 200, the controlling server 102 knows all "visiting" UEs in the MBSFN areas owned (managed) by the server 102. Therefore, the controlling server 102 can consider the total number of its own and "visiting" UEs 130 in each MBSFN area when deciding whether to allocate an MBMS bearer in a particular MBSFN for a group call session. In addition to explicitly identifying the UEs, the participating server 104 could also simply provide a count of UEs that are located within a particular MBSFN area of the controlling server 102.

With respect to the UE 130-2, the MBSFN Report procedure 200 can include an optional extension 210 when the UE 130-2 that belongs to the controlling server 102 moves to an MBSFN area that is not accessible by its controlling server 102. For example, assume the UE 130-2 moves to an MBSFN area controlled by the participating server 104. The UE 130-2 can send a UE MBSFN Update message 212 to the controlling server 102 with the new area ID. Then the controlling server 102 may inform the participating server 104 about the visiting UE 130-2 via a MBSFN Report message 214.

Figure 3:
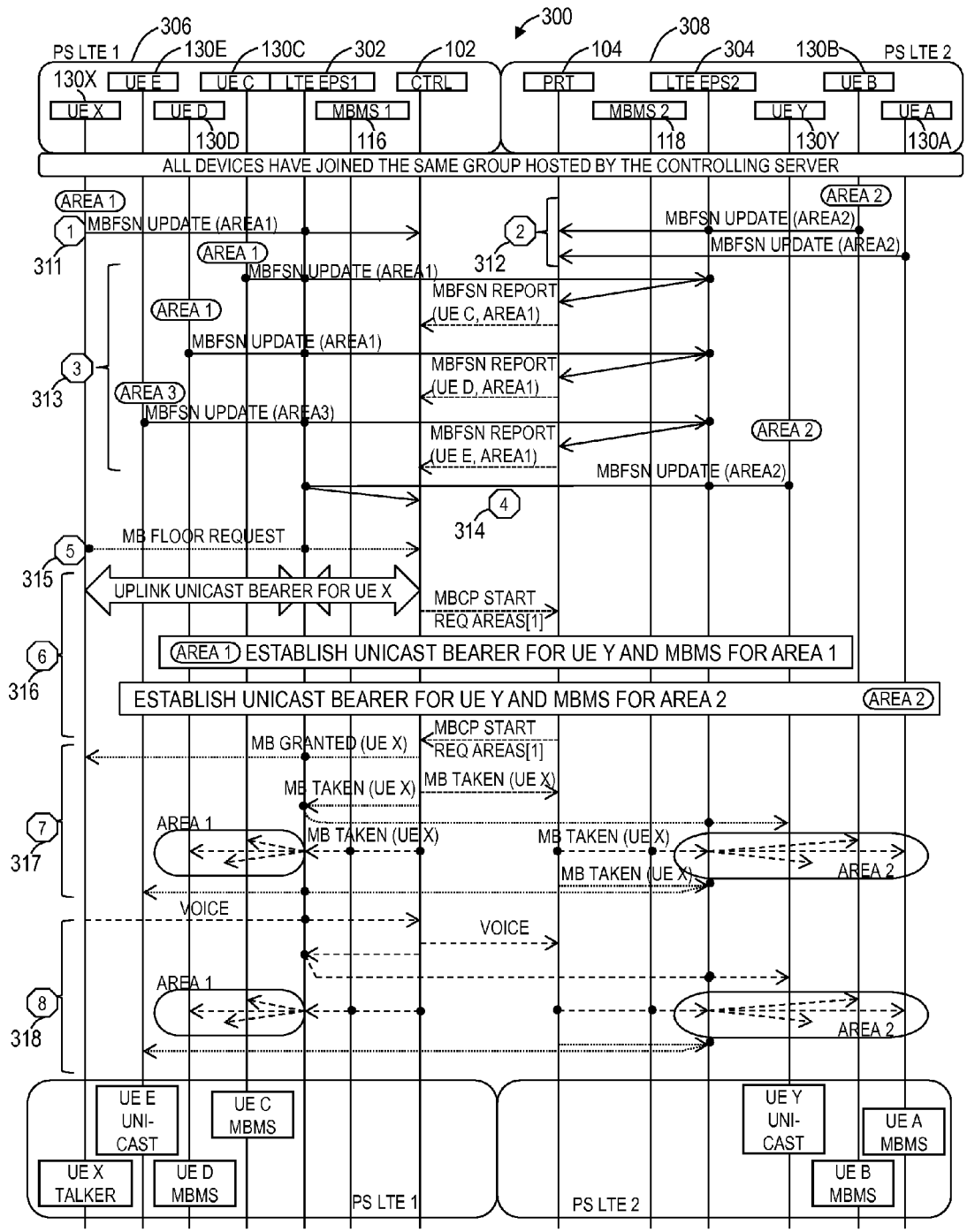
FIG. 3 is a flow diagram of an exemplary session of the MBSFN Report procedure of FIG. 2 with various UEs, the controlling server, the participating server, MBMS gateways, and LTE evolved packet systems (EPSs) in accordance with some embodiments.

Referring to FIG. 3, in an exemplary embodiment, a flow diagram illustrates an exemplary session 300 of the MBSFN Report procedure 200 with various UEs 130 (depicted in FIG. 3 as UEs 130A-130E, 130X, and 130Y), the controlling server 102, the participating server 104, MBMS gateways 116, 118, and LTE evolved packet systems (EPSs) 302, 304. The exemplary session 300 further includes the two PS LTEs 306, 308. All UEs 130 have joined the same group that is hosted/homed by the controlling server 102. Both the UEs 130X, 130Y belong to controlling server 102. The UE 130X is located in its home PS LTE 306 but the UE 130Y is visiting the PS LTE 308.

The UEs 130A, 130B, 130C, 130D, 130E all belong to the participating server 104. The UEs 130A, 130B are in their home PS LTE 308, but the UEs 130C, 130D, 130E are visiting the PS LTE 306. All the UEs 130 are shown sending in a MBSFN Update to their respective server 102, 104. It may happen when the UEs 130 change their MBSFN Areas. In real scenarios the UEs 130 more likely will have already reported their MBSFN areas. The MBSFN Update is shown in steps 311-314 of FIG. 3 to illustrate different signaling when reporting devices belong to the controlling server 102 or the participating server 104 and are located at home PS LTE or are visiting some PS LTE. At a step 315, a user of the UE 130X decides to start a group session for the group and PTTs. Subsequently, voice (media) from the current talker (i.e., the UE 130X) is distributed to all UEs 130 affiliated to the group via unicast and/or MBMS broadcast bearers.

In the steps 311, 312, the UEs 130 at home report their MBSFN areas. In the step 311, the UE 130X creates and sends a MBSFN Update message to its server, which is the controlling server 102, to provide its current Area ID. Since the UE 130X is at home in the PS LTE 306, the message goes directly to the controlling server 102 via the LTE EPS 302. Note, the controlling server 102 does not need to inform any participating servers of UE 130X's area because the UE 130X is in home PS LTE 306. In the step 312, the UEs 130A, 130B send MBSFN Update messages to their server, i.e., the participating server 104, to provide their current Area ID 2. Since they are at home in the PS LTE 308, the messages go directly to participating server 104 via the LTE EPS 304. Note, the participating server 104 does not need to inform the group controlling server 102 of the area of the UEs 130A, 130B because they are at home.

In the step 313, the visiting UEs 130C, 130D, 130E report their MBSFN Areas to the participating server 104. The UEs 130C, 130D, 130E all belong to the participating server 104 but they currently are visiting the PS LTE 306. To report their MBSFN areas they create and send MBSFN Update messages to their server, i.e., the participating server 104. Since they are visiting the PS LTE 306, the messages go to the participating server 104 via the LTE EPS 302 and the LTE EPS 304. The UEs 130C, 130D provide their current Area ID 1 and the UE 130E provides its current Area ID 3 in the PS LTE 306.

Upon receiving a MBSFN update, the participating server 104 determines that the reported area (Area 1 or Area 3) belongs to the PS LTE 306 of the controlling server 102. Since the server 104 is a participating server and the server 102 is the controlling server for this group session, the participating server 104 sends a new MBSFN Report message to the controlling server 102 over RTCP (that was created between the servers for this group at the group setup). The controlling server 102 keeps track of MBSFN areas in its PS LTE 306 that have UEs (home and visiting) joined to the group, which includes Area 1 with three devices (UE 130X, UE 130C, and UE 130D).

Alternatively, sending multiple messages may be optimized by introducing a session independent MBSFN Report message from the participating server 104 to the controlling server 102. Then controlling server 102 may take care of making this information available to all groups controlled by the controlling server 102. However since sending such a message for every visiting UE 130 regardless which group session it is joined seems undesirable, it could be possible to define triggers for sending the message. Also this new message is session/call independent therefore it may preferably be Session Initiation Protocol (SIP) (SIP PUBLISH or NOTIFY).

In the step 314, the visiting UEs report their MBSFN Area to the controlling server 102. The UE 130Y belongs to the controlling server 102 but it currently is visiting PS LTE 308. To report its MBSFN area, the UE 130Y creates and sends an MBSFN Update message to its home controlling server 102 via the LTE EPS 304 and the LTE EPS 302. The UE 130Y provides its current Area ID 2 in PS LTE 308. Upon receiving the message, the controlling server 102 keeps track of the UE 130Y location but does not notify the participating server 104 from the PS LTE 308 about the UE 130Y location.

In the step 315, there is a request for the floor. The user of the UE 130X wants to start a group call for the group. The UE 130X that belongs to the controlling server 102 and is currently located in Area 1 of home PS LTE 306 sends a Media Burst (MB) Floor Request to the controlling server 102 over RTCP that was established during joining to the chat session. Upon receiving the request, the controlling server 102 decides to start a group call for the pre-setup group. The controlling server 102 establishes an uplink unicast Guaranteed Bit Rate (GBR) bearer. Notice that this step also can be performed after sending out MBCP Start Request message in the next step.

In a step 316, the session 300 establishes/reserves PS LTE resources. The step 317 is illustrates allocating resources during starting a call procedure. The controlling server 102 determines MBSFN Areas in the PS LTE 306 where MBMS bearers will be used for the group call (taking into consideration all of the controlling server's UEs 130 at home as well as all visiting UEs 130 to the PS LTE 306). Assume that in this case the controlling server 102 decides to use MBMS only in Area 1 (with visiting UEs 130C, 130D and with UE 130X at home). The controlling server 102 sends a MBCP Start Request message to the participating server 104 over RTCP connecting between the controlling server 102 and the participating server 104 that has been created for this chat session. The message includes starting rules and a list of active MBSFN Areas. The starting rules define conditions when the participating server 104 shall send MBCP Start Response message(s). The list of active MBSFN areas includes MBSFN Areas from the PS LTE 306 where MBMS bearers will be (are) used for media and signaling distribution for the group call and that have one or more UEs that belong to the participating server 104. Another option could be to include all MBSFN Areas in the PS LTE 306 with active MBMS.

The controlling and participating servers 102, 104 determine whether a unicast or an MBMS bearer can be used for each UE 140 involved in the group call and establish appropriate bearers. The controlling server 102 establishes a unicast bearer in the PS LTE 308 for the visiting UE 130Y and MBMS in Area 1 in the PS LTE 306 for the UEs 130C, 130D, 130X. The participating server 104 establishes a unicast bearer in the PS LTE 306 for the visiting UE 130E and MBMS in Area 2 in the PS LTE 308. Notice that the participating server 104 does not need to establish bearers for the UEs 130C, 130D (visiting the PS LTE 306) because the participating server 104 knows that they will get media via MBMS in MBSFN Area 1. The participating server 104 monitors bearer establishment results, determines that the call is ready to be started (e.g., all bearers are established), and sends MBCP Start Response message to the controlling server 102.

In step 317, the session 300 includes the floor being granted. The controlling server 102 determines that the group call can be started now and the first talker being the UE 130X (that requested the floor in the step 315). The controlling server 102 sends a MB Granted message directly to the UE 130X. The controlling server 102 creates a MB Taken message indicating the current talker UE 130X and distributes the message. Specifically, the MB Taken message is sent to the participating server 104 via RTCP between the servers 102, 104 for further distribution by the participating server 104, is sent to the UE 130Y by a unicast bearer via the PS LTE 306 and the PS LTE 308, and is sent to the UEs 130C, 130D by MBMS in Area 1. Upon receiving MB Taken message the participating server 104 distributes the message to the UE 130E by a unicast bearer via the PS LTE 308 and the PS LTE 306 and to the UEs 130A, 130B by MBMS in Area 2.

In step 318, the session 300 includes voice distribution. The UE 130X sends media on a designated uplink bearer to the controlling server 102. The controlling server 102 distributes the media to the participating server 104 via Real Time Protocol (RTP) between the servers 102, 104 for further distribution by the participating server 104, to the UE 130Y over RTP by a unicast bearer via the PS LTE 306 and the PS LTE 308, and to the UEs 130C, 130D by MBMS in Area 1. Upon receiving media, the participating server 104 distributes the media to the UE 130E over RTP by a unicast bearer via the PS LTE 308 and the PS LTE 306 and to the UEs 130A, 130B by MBMS in Area 2. Note, the exemplary embodiment of FIG. 3 relates to a chat group session, but those of ordinary skill in the art will recognize these aforementioned steps and techniques can apply to any type of group sessions.

Figure 4:
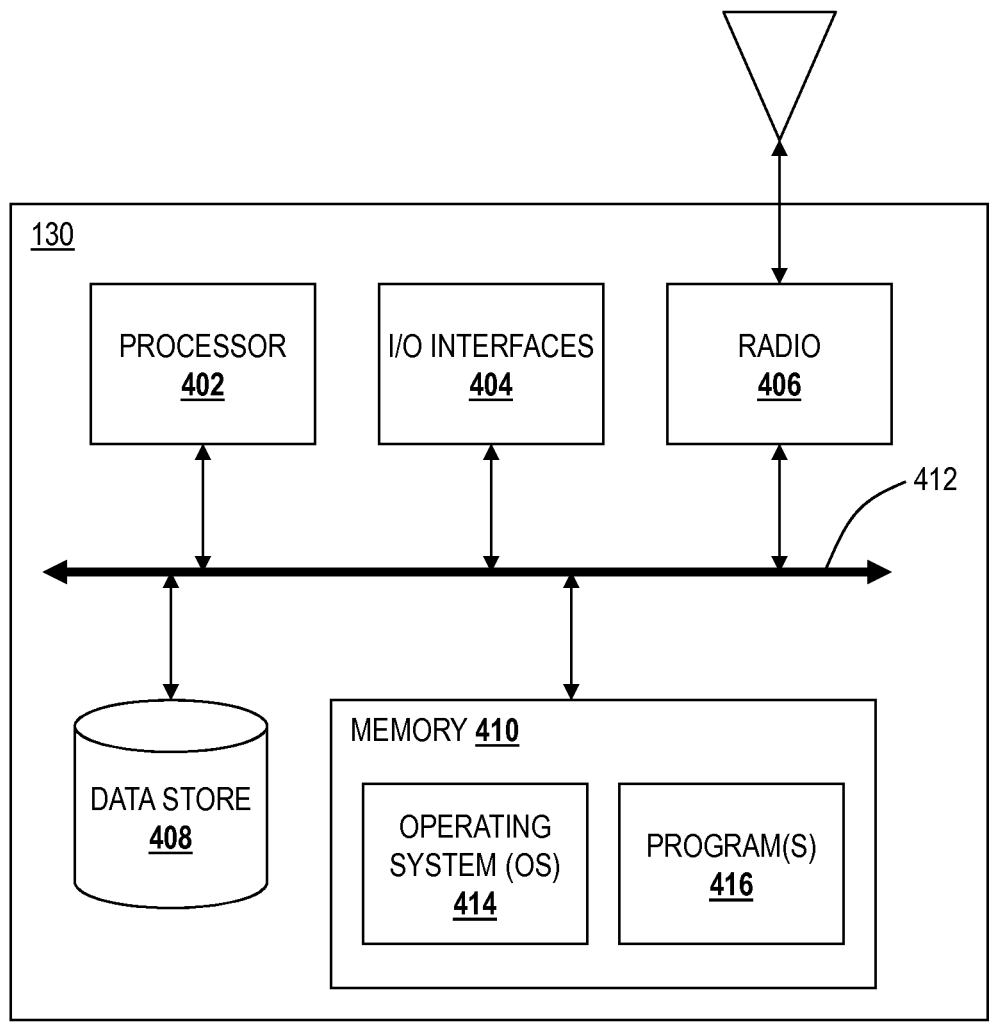
FIG. 4 is a block diagram of an exemplary implementation of the UE in accordance with some embodiments.

Referring to FIG. 4, in an exemplary embodiment, a block diagram illustrates an exemplary implementation of the UE 130. The UE 130 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the UE 130 in an oversimplified manner, and a practical embodiment can include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the UE 130, a semiconductor-based microprocessor (in the form of a microchip or chip set), or generally any device for executing software instructions. When the UE 130 is in operation, the processor 402 is configured to execute software stored within the memory 410, to communicate data to and from the memory 410, and to generally control operations of the UE 130 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the UE 130.

The radio 406 enables wireless communication to an external access device or network. Any number of suitable wireless data communication protocols, techniques, or methodologies can be supported by the radio 406, including, without limitation: RF; LMR; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 can be used to store data. The data store 408 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 can incorporate electronic, magnetic, optical, and/or other types of storage media.

The memory 410 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 can have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 can include various applications, add-ons, etc. configured to provide end user functionality with the UE 130 including various aspects in the network 100, the MBSFN Report procedure 200, and/or the session 300.

Figure 5:
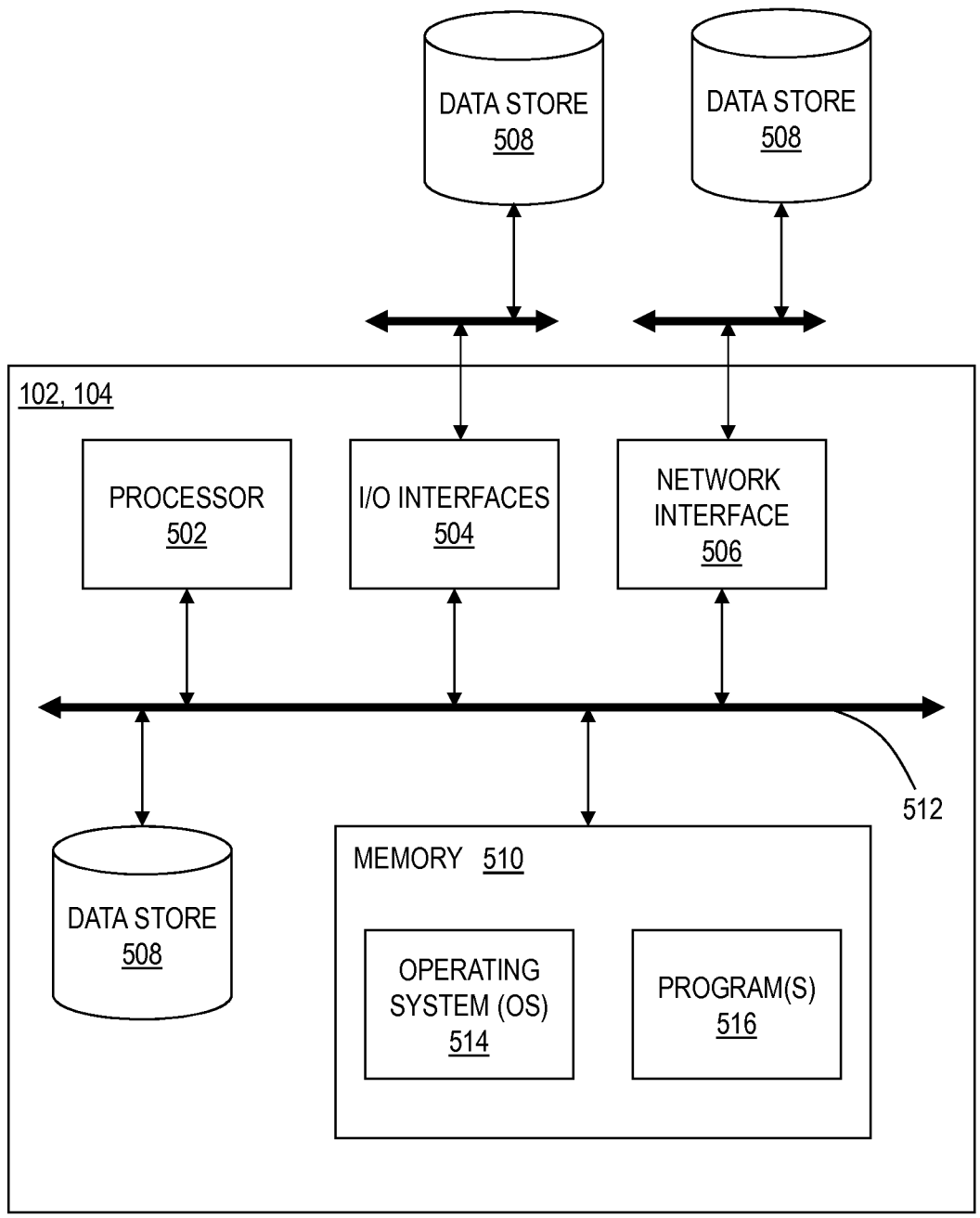
FIG. 5 a block diagram of an exemplary implementation of a server for the controlling server and/or participating server in accordance with some embodiments.

Referring to FIG. 5, in an exemplary embodiment, a block diagram illustrates an exemplary implementation of the server 102, 104. The server 102. 104 can be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 102, 104 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 can be, for example but not limited to, one or more buses or other wired or wireless connections, as is known in the art. The local interface 512 can have additional elements, which are omitted for simplicity, such as controllers, buffers (caches), drivers, repeaters, and receivers, among many others, to enable communications. Further, the local interface 512 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the server 102, 104, a semiconductor-based microprocessor (in the form of a microchip or chip set), or generally any device for executing software instructions. When the server 102, 104 is in operation, the processor 502 is configured to execute software stored within the memory 510, to communicate data to and from the memory 510, and to generally control operations of the server 102, 104 pursuant to the software instructions. The I/O interfaces 504 can be used to receive user input from and/or for providing system output to one or more devices or components. User input can be provided via, for example, a keyboard, touch pad, and/or a mouse. System output can be provided via a display device and a printer (not shown). I/O interfaces 504 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 506 can be used to enable the server 102, 104 to communicate on a network, such as to communicate with other servers 102, 104 and/or with the UEs 130. The network interface 506 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 506 can include address, control, and/or data connections to enable appropriate communications on the network. A data store 508 can be used to store data. The data store 508 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be located internal to the server 102, 104 such as, for example, an internal hard drive connected to the local interface 512 in the server 102, 104. Additionally in another embodiment, the data store 508 can be located external to the server 102, 104 such as, for example, an external hard drive connected to the I/O interfaces 504 (e.g., SCSI or USB connection). In a further embodiment, the data store 508 can be connected to the server 102, 104 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. Note that the memory 510 can have a distributed architecture, where various components are situated remotely from one another, but can be accessed by the processor 502. The software in memory 510 can include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein such as with respect to the network 100, the MBSFN Report procedure 200, and/or the session 300.

Figure 6:
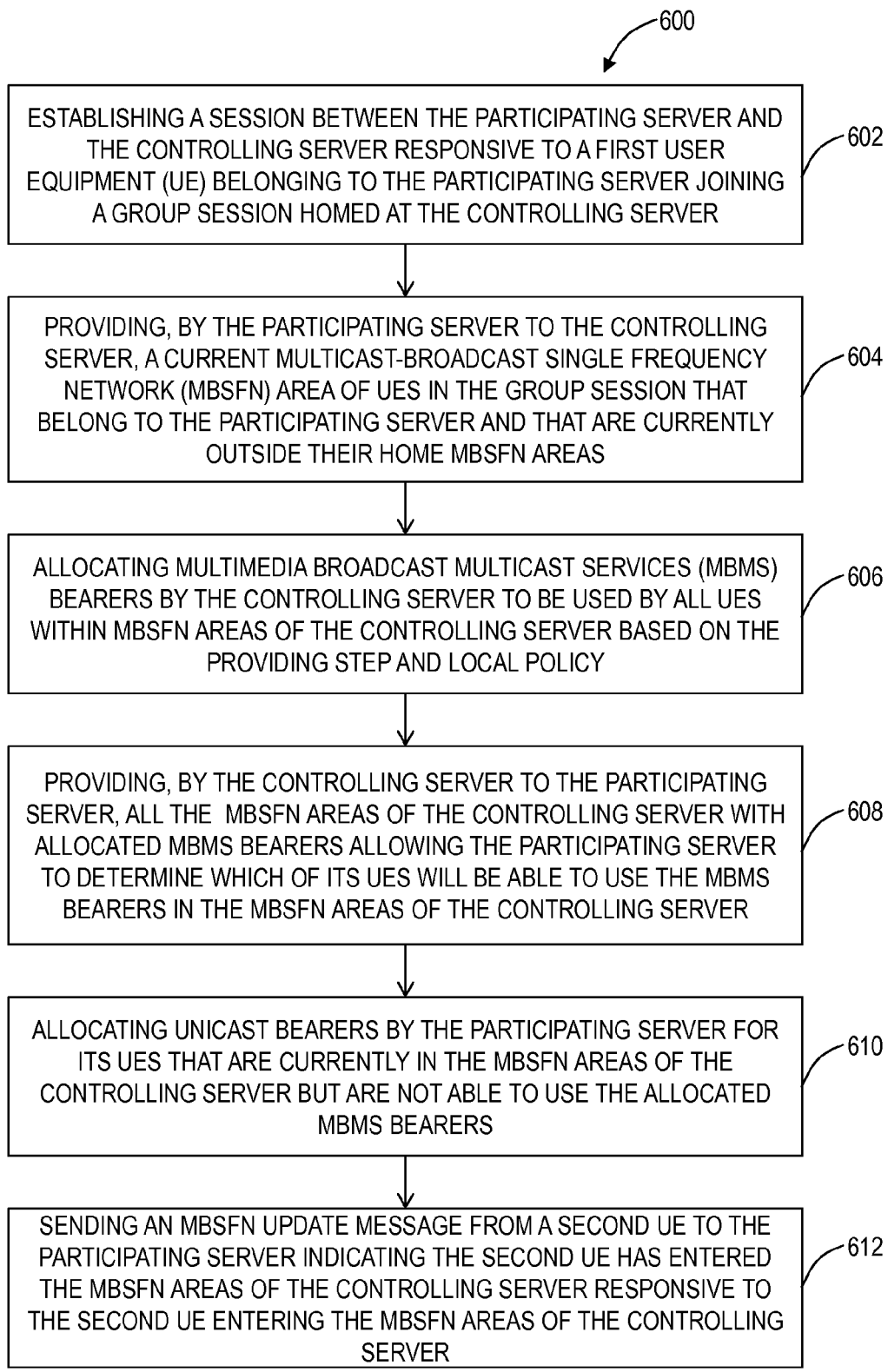
FIG. 6 is a flowchart of a method between a controlling server and a participating server in accordance with some embodiments.

Referring to FIG. 6, in an exemplary embodiment, a flowchart illustrates a method 600 between a controlling server and a participating server. This can be implemented by the controlling server 102 and the participating server 104. The method 600 includes establishing a session between the participating server and the controlling server responsive to a first User Equipment (UE) belonging to the participating server joining a group session homed at the controlling server (step 602). The method 600 includes providing, by the participating server to the controlling server, a current Multicast-Broadcast Single Frequency Network (MBSFN) area of UEs in the group session that belong to the participating server and that are currently outside their home MBSFN areas (step 604). The method 600 further includes allocating Multimedia Broadcast Multicast Services (MBMS) bearers by the controlling server to be used by all UEs within MBSFN areas of the controlling server based on the providing step and local policy (step 606).

The method 600 can further include providing, by the controlling server to the participating server, all the MBSFN areas of the controlling server with allocated MBMS bearers allowing the participating server to determine which of its UEs will be able to use the MBMS bearers in the MBSFN areas of the controlling server (step 608). The method 600 can further include allocating unicast bearers by the participating server for its UEs that are currently in the MBSFN areas of the controlling server but are not able to use the allocated MBMS bearers (step 610). The method 600 can further include sending an MBSFN update message from a second UE to the participating server indicating the second UE has entered the MBSFN areas of the controlling server responsive to the second UE entering the MBSFN areas of the controlling server (step 612). The method 600 can also include providing, by the participating server to the controlling server the MBSFN area of the second UE.

The participating server can be configured in the providing step 604 to limit the current MBSFN area of the UEs to UEs within the MBSFN areas of the controlling server. The session can be a Real Time Control Protocol session, and the providing step 604 can include sending the current MBSFN area of the UEs via a message over the Real Time Control Protocol session. The controlling server can perform the allocating step 606 knowing how many visiting UEs and UEs homed at the controlling server are present in the MBSFN areas of the controlling server. The method 600 can include using the MBMS bearers for a first set of visiting UEs in the MBSFN areas of the controlling server, and using unicast bearers for a second set of visiting UEs in the MBSFN areas of the controlling server.

The providing step 604 can be performed by including an MBSFN area of a UE in a message from the participating server to the controlling server adding the UE to the group call, which message can be a Session Initiation Protocol INVITE message. The method 600 can include operating a network-network interface (NNI) link between the controlling server and the participating server, and utilizing signaling on the NNI link such that the controlling server is aware of all visiting UEs homed at the participating server.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method between a controlling server and a participating server, comprising:
   establishing a session between the participating server and the controlling server responsive to a first User Equipment (UE) belonging to the participating server joining a group session homed at the controlling server;
   conveying, by the participating server to the controlling server, control signaling comprising a current broadcast area of UEs in the group session that belong to the participating server and that are currently outside their home broadcast areas; and
   allocating broadcast bearers by the controlling server to be used by all UEs within broadcast areas of the controlling server based on the conveying step and local policy; and
   wherein each of the current broadcast area, the home broadcast areas, and the broadcast areas of the controlling server comprises a Multicast-Broadcast Single Frequency Network (MBSFN) area; and wherein the broadcast bearers comprise Multimedia Broadcast Multicast Services (MBMS) bearers.

2. The method of claim 1, further comprising:
   providing, by the controlling server to the participating server, all the MBSFN areas of the controlling server with allocated MBMS bearers allowing the participating server to determine which of its UEs will be able to use the MBMS bearers in the MBSFN areas of the controlling server.

3. The method of claim 2, further comprising:
   allocating unicast bearers by the participating server for its UEs that are currently in the MBSFN areas of the controlling server but are not able to use the allocated MBMS bearers.

4. The method of claim 1, wherein the participating server is configured in the providing step to limit the current MBSFN area of the UEs to UEs within the MBSFN areas of the controlling server.

5. The method of claim 1, wherein the session comprises a Real Time Control Protocol session, and the providing comprises sending the current MBSFN area of the UEs via a message over the Real Time Control Protocol session.

6. The method of claim 1, further comprising:
   sending an MBSFN update message from a second UE to the participating server indicating the second UE has entered the MBSFN areas of the controlling server responsive to the second UE entering the MBSFN areas of the controlling server; and
   providing, by the participating server to the controlling server the MBSFN area of the second UE.

7. The method of claim 1, wherein the controlling server performs the allocating step knowing how many visiting UEs and UEs homed at the controlling server are present in the MBSFN areas of the controlling server.

8. The method of claim 1, further comprising:
   using the MBMS bearers for a first set of visiting UEs in the MBSFN areas of the controlling server; and
   using unicast bearers for a second set of visiting UEs in the MBSFN areas of the controlling server.

9. The method of claim 1, wherein the providing step is performed by including an MBSFN area of a UE in a message from the participating server to the controlling server adding the UE to the group session;
   wherein the message comprises a Session Initiation Protocol INVITE message.

10. The method of claim 1, further comprising:
    operating a network-network interface (NNI) link between the controlling server and the participating server; and
    utilizing signaling on the NNI link such that the controlling server is aware of all visiting UEs homed at the participating server.

11. The method of claim 1, further comprising:
    deciding, by the controlling server, to allocate/activate a MBMS bearer for the group session in one of the MBSFN areas of the controlling server;
    providing, by the controlling server to the participating server, one of a notification of the one of the MBSFN areas with the MBMS bearer for the group session and an updated list of active MBSFN areas of the controlling server; and
    determining, by the participating server, that at least one UE in the one of the MBSFN areas will use the MBMS bearer and releasing a unicast bearer for the at least one UE.

12. The method of claim 1, further comprising:
    deciding, by the controlling server, to deallocate a MBMS bearer for the group session in one of the MBSFN areas of the controlling server;
    providing, by the controlling server to the participating server, one of a notification of the one of the MBSFN areas where the MBMS bearer has been deallocated for the group session and an updated list of active MBSFN areas of the controlling server; and
    determining, by the participating server, that at least one UE cannot use the MBMS bearer and allocating a unicast bearer for the at least one UE.

13. A network, comprising:
    a controlling server;
    a participating server communicatively coupled to the controlling server via a network-network interface (NNI) link;
    wherein the participating server is configured to receive, from a user equipment (UE) homed at and communicatively coupled to the participating server, an update related to Multicast-Broadcast Single Frequency Network (MBSFN) areas currently visited which are outside of MBSFN areas of the participating server;
    wherein the participating server is configured to convey, to the controlling server, control signaling comprising an update related to the MBSFN areas currently visited by the UE; and
    wherein the controlling server is configured to allocate Multimedia Broadcast Multicast Services (MBMS) bearers for MBSFN areas of the controlling server based on a total number of UEs in the MBSFN areas of the controlling server including both UEs homed at the controlling server and UEs visiting the MBSFN areas of the controlling server.

14. The network of claim 13, wherein the controlling server is configured to provide to the participating server over the NNI link all visiting UEs in the MBSFN areas of the controlling server using the MBMS bearers; and wherein the participating server is configured to allocate unicast bearers for its UEs that do not use the MBMS bearers in the MBSFN areas of the controlling server based on a local decision by the participating server.

15. The network of claim 13, wherein the participating server is configured to limit reporting of the current MBSFN area of the UEs to UEs within the MBSFN areas of the controlling server.

16. A server, comprising:
a network interface communicatively coupled to a network, wherein the server is communicatively coupled to a second server and at least one User Equipment (UE) homed at the server;
a processor; and
memory storing instructions that, when executed, cause the processor to:
receive Multicast-Broadcast Single Frequency Network (MBSFN) area updates from the at least one UE;
configure the server to operate as one of a controlling server and a participating server for a group session;
when configured as the participating server, convey, to the second server, control signaling comprising the MBSFN area updates; and
when configured as the controlling server, allocate Multimedia Broadcast Multicast Services (MBMS) bearers based on a total number of UEs including visiting UEs.

17. The server of claim 16, wherein the instructions, when executed, further cause the processor to:
provide the second server an update on which UEs homed at the second server are using the MBMS bearers when configured as the controlling server.

18. The server of claim 16, wherein the instructions, when executed, further cause the processor to:
allocate unicast bearers for at least one UE visiting an MBSFN area associated with the second server based on a local decision when configured as the participating server.

19. The server of claim 16, wherein the instructions, when executed, further cause the processor to:
limit the MBSFN area updates to the second server to whether the at least one UE is in an MBSFN area of the second server when configured as the participating server.

* * * * *